United States Patent
Natan et al.

(10) Patent No.: US 8,320,346 B2
(45) Date of Patent: Nov. 27, 2012

(54) APPARATUS AND METHODS FOR UNIVERSAL SERVICES INTERFACE NETWORKING

(75) Inventors: Eetay Natan, Ramat Gan (IL); Conor Cahill, Waterford, VA (US)

(73) Assignee: Intel Corporation, Santa Clara, CA (US)

( * ) Notice: Subject to any disclaimer, the term of this patent is extended or adjusted under 35 U.S.C. 154(b) by 501 days.

(21) Appl. No.: 12/586,707

(22) Filed: Sep. 25, 2009

(65) Prior Publication Data
US 2011/0075643 A1    Mar. 31, 2011

(51) Int. Cl.
*H04W 92/02* (2009.01)
*G06F 15/177* (2006.01)
(52) U.S. Cl. .................. 370/338; 709/221
(58) Field of Classification Search ............. 370/328, 370/338; 709/227, 228, 229, 221
See application file for complete search history.

(56) References Cited

U.S. PATENT DOCUMENTS

| | | | |
|---|---|---|---|
| 6,594,700 B1 | 7/2003 | Graham et al. | |
| 7,953,863 B2* | 5/2011 | Venkatachalam et al. | .... 709/227 |
| 7,979,296 B2* | 7/2011 | Kruse et al. | ........... 705/7.26 |
| 2008/0081644 A1* | 4/2008 | Min et al. | ........... 455/458 |
| 2008/0104201 A1* | 5/2008 | Moon et al. | ........... 709/218 |
| 2008/0107092 A1 | 5/2008 | Taaghol et al. | |
| 2008/0279136 A1* | 11/2008 | Taaghol et al. | ........... 370/328 |
| 2009/0201842 A1 | 8/2009 | Guan | |

OTHER PUBLICATIONS

International Search Report and Written Opinion received for PCT Application No. PCT/US2010/044156, Mailed on Feb. 1, 2011, 10 pages.

* cited by examiner

*Primary Examiner* — Brian D Nguyen
(74) *Attorney, Agent, or Firm* — Schwabe, Williamson & Wyatt, P.C.

(57) ABSTRACT

Embodiments of systems and methods for Universal System Interface (USI) networking are generally described herein. In some embodiments, a USI request may be received by a station configured for heterogeneous wireless communication from an application service provider (ASP) over a first access network. The USI request may include a fully qualified domain name (FQDN) of a USI system for services provided by a network service provider (NSP) over a second access network. The station may then determine the USI system address based on the FQDN Other embodiments may be described and claimed.

20 Claims, 6 Drawing Sheets

APPARATUS AND METHODS FOR UNIVERSAL SERVICES INTERFACE NETWORKING

The present disclosure relates generally to the field of wireless communications and more particularly to methods and related systems for Universal Services Interface networking.

BACKGROUND

As wireless communication becomes more and more popular at offices, homes, and schools, different wireless technologies and applications may work in tandem to meet the demand for computing and communications at anytime and/or anywhere. For example, a variety of wireless communication networks may co-exist in a single platform to provide a wireless environment with more computing and/or communication capability, greater mobility, and/or eventually seamless roaming.

In particular, wireless personal area networks (WPANs) may offer fast, short-distance connectivity within a relatively small space such as an office workspace or a room within a home. Wireless local area networks (WLANs) may provide broader range than WPANs within office buildings, homes, schools, etc. Wireless metropolitan area networks (WMANs) may cover a greater distance than WLANs by connecting, for example, buildings to one another over a broader geographic area. Wireless wide area networks (WWANs) may provide an even broader range as such networks are widely deployed in cellular infrastructure.

There is ongoing interest in developing and deploying mobile networks which may facilitate transfer of information at broadband bandwidth and rates. These networks are colloquially referred to herein as broadband wireless access (BWA) networks and may include networks operating in conformance with one or more protocols specified by the 3.sup.rd Generation Partnership Project (3GPP) and its derivatives or the Institute for Electrical and Electronic Engineers (IEEE) 802.16 standards (e.g., IEEE 802.16-2005) although the embodiments discussed herein are not necessarily so limited. IEEE 802.16 compliant BWA networks are sometimes referred to as WiMAX networks, an acronym that stands for Worldwide Interoperability for Microwave Access, which is a certification mark for products that pass conformity and interoperability tests for the IEEE 802.16 standards In modeling the deployment and implementation of WiMAX networks, there are ongoing questions on how to best integrate cooperation between network service providers (NSPs), which are the providers that operate network infrastructure and provide wireless access to subscribers, Application Service Providers (ASPs), and Internet Application Service Providers (iASPs) (e.g., GOOGLE®, YAHOO®, etc.), which are providers that offer aggregated content on the public Internet Protocol (IP) networks including content providers (CPs) and/or Internet advertisers (IAs). A Universal Services Interface (USI) has been developed as a framework for specifying required WiMAX network interfaces towards trusted third party ASPs and iASPs. These network interfaces allow exposure of WiMAX network capabilities and mobile user information in a secure and controlled manner.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
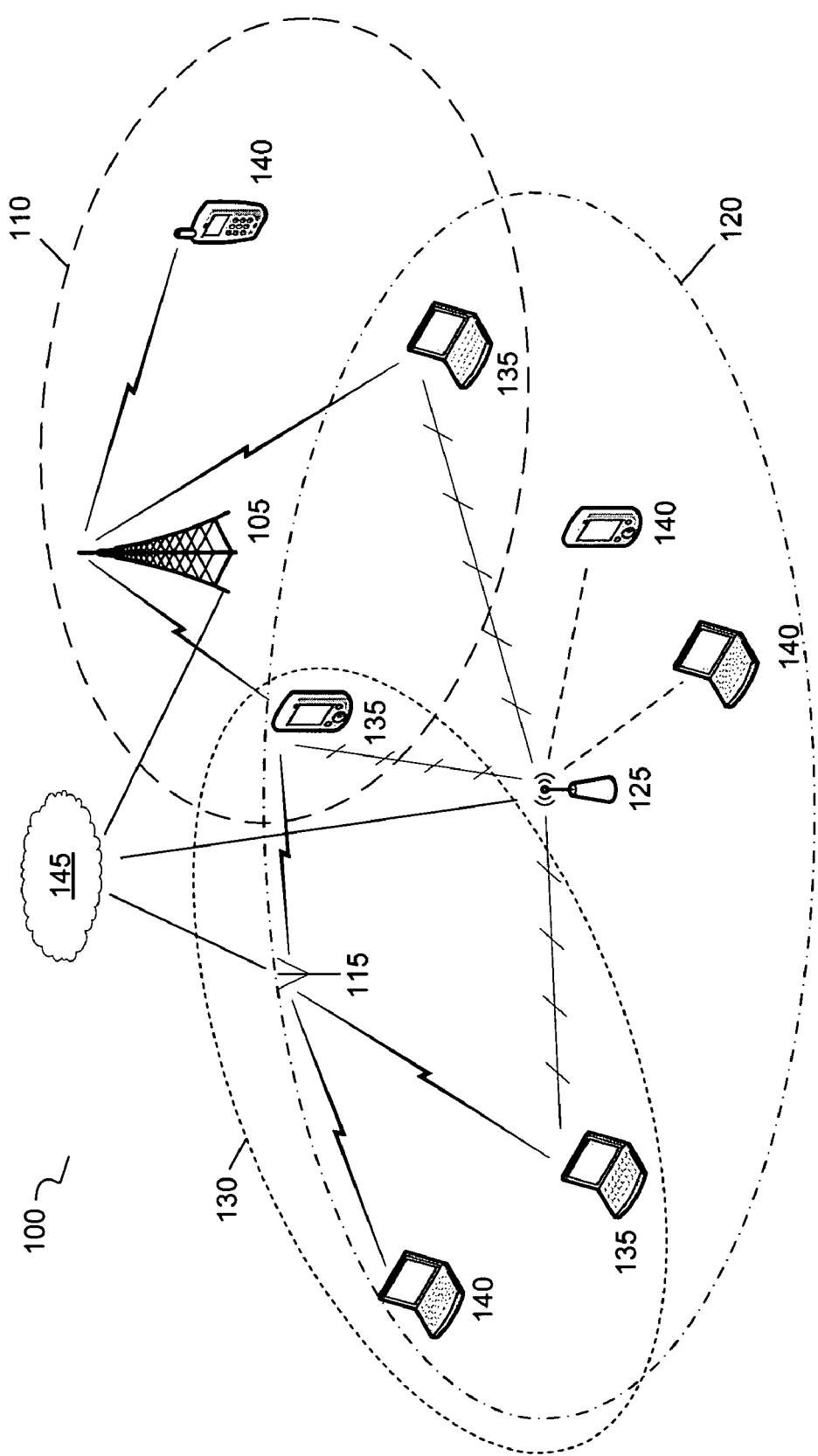
FIG. 1 illustrates wireless networks in accordance with some embodiments.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details of an apparatus and methods for Universal Services Interface (USI) networking are set forth to provide a thorough understanding of the invention. However, it will be understood by those skilled in the art that the present invention may be practiced without these specific details. In other instances, well-known methods, procedures, components and circuits have not been described in detail so as not to obscure the present invention.

It would be an advance in the art to provide a system and methods for multi-radio coordination of wireless networks in a multi-mode device or multiple communication platform (multi-corn platform) wherein the multi-corn platform does not have access to at least one of the wireless networks. For example, the multi-com platform is configured to communicate through a first wireless network that implements resource management and scheduling protocols such as channel-aware scheduling, multi-cell coordination, fractional frequency reuse, and opportunistic beam forming to provide relatively high data throughput by implementing channel quality indicator feedback(s) and a centralized scheduling mechanism. The multi-com platform is also configured to communicate through a second network. In contrast, the second network, such as a contention-based network may lack capabilities otherwise provided by the first wireless network. At times, the multi-com platform may have access to the second network but not the first wireless network but it would be a benefit for the multi-com platform to access and/or benefit from capabilities offered by the first wireless network through the second network.

Now turning to the figures, FIG. 1 illustrates a wireless communication system 100 in accordance with some embodiments of the invention. The wireless communication system 100 includes a plurality of wired and wireless networks, generally shown as 110, 120, and 130. In particular, the wireless communication system 100 may include a wireless metropolitan area network (WMAN) 110, a wireless local area network (WLAN) 120, and a wireless personal area network (WPAN) 130. Although FIG. 1 depicts three wireless networks, the wireless communication system 100 may include additional or fewer wireless communication networks and one or more wired networks. For example, the wireless communication system 100 may include additional WPANs, WLANs, and/or WMANs. The methods and apparatus described herein are not limited in this regard.

The wireless communication system 100 also includes one or more stations (STA) including subscriber stations or mobile stations generally shown as multi-radio subscriber stations 135 capable of heterogeneous wireless communication by accessing a plurality of wireless networks and wired networks (not shown), and single-radio subscriber stations 140 capable of accessing a single wireless network. For example, the subscriber stations 135 and 140 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts seven subscriber stations, the wireless communication system 100 may include more or less multi-radio subscriber stations 135 and/or single-radio subscriber stations 140.

The subscriber stations 135 and 140 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, orthogonal frequency-division multiple access (OFDMA), multi-carrier modulation (MDM), and/or other suitable modulation techniques to communicate via wireless links.

In an embodiment, the subscriber stations 135 and 140 may use direct sequence spread spectrum (DSSS) modulation and/or frequency hopping spread spectrum (FHSS) modulation to implement the WLAN 120 (e.g., the 802.11 family of standards developed by the Institute of Electrical and Electronic Engineers (IEEE) and/or variations and evolutions of these standards). For example, the subscriber stations 135 and/or 140 may communicate with devices associated with the WLAN 120 or an access point 125 via wireless links. The AP 125 may be operatively coupled to a router (not shown). Alternatively, the AP 125 and the router may be integrated into a single device (e.g., a wireless router).

The subscriber stations (e.g. multi-radio subscriber station 135 and a single-radio subscriber station 140) may use OFDM or OFDMA modulation to transmit large amounts of digital data by splitting a radio frequency signal into multiple small sub-signals, which in turn, are transmitted simultaneously at different frequencies. In particular, the subscriber stations may use OFDM modulation to implement the WMAN 110. For example, the multi-radio subscriber station 135 may operate in accordance with the 802.16 family of standards developed by IEEE to provide for fixed, portable, and/or mobile broadband wireless access (BWA) networks (e.g., the IEEE std. 802.16, published 2004) to communicate with the base station 105, via wireless link(s).

Although some of the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). In some embodiments, access point 125 and base station 105 may communicate in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for WLANs, although the scope of the invention is not limited in this respect as they may also be suitable to transmit and/or receive communications in accordance with other techniques and standards. In some embodiments, access point 125 and base station 105 may communicate in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions.

The WMAN 110 and WLAN 120 may be operatively coupled to a common public or private network 145 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 120 may be operatively coupled to the common public or private network 145 via the AP 125 and/or WPAN STA 115 serving the WPAN 130. In another example, the WMAN 110 may be operatively coupled to the common public or private network 145 via the base station 105.

The wireless communication system 100 may include other suitable wireless communication networks. For example, the wireless communication system 100 may include a wireless wide area network (WWAN) (not shown). The subscriber stations may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, standards based on these technologies, variations and evolutions of these standards, and/or other suitable wireless communication standards. The WPAN may operate in a 60 GHz band to will achieve throughputs of about several Gbps. Currently a number of standardization groups (Institute for Electronic and Electrical Engineers (IEEE) 802.15.3c, IEEE 802.11 ad, Wireless HD SIG, ECMA TG20) are working on the development of the specifications for such mmWave WPAN 130 and WLAN 120 networks. Although FIG. 1 depicts the WMAN 110, WLAN 120, and the WPAN 130 the wireless communication system 100 may include other combinations of WPANs, WLANs, WMANs, and/or WWANs. The methods and apparatus described herein are not limited in this regard.

The wireless communication system 100 may further include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
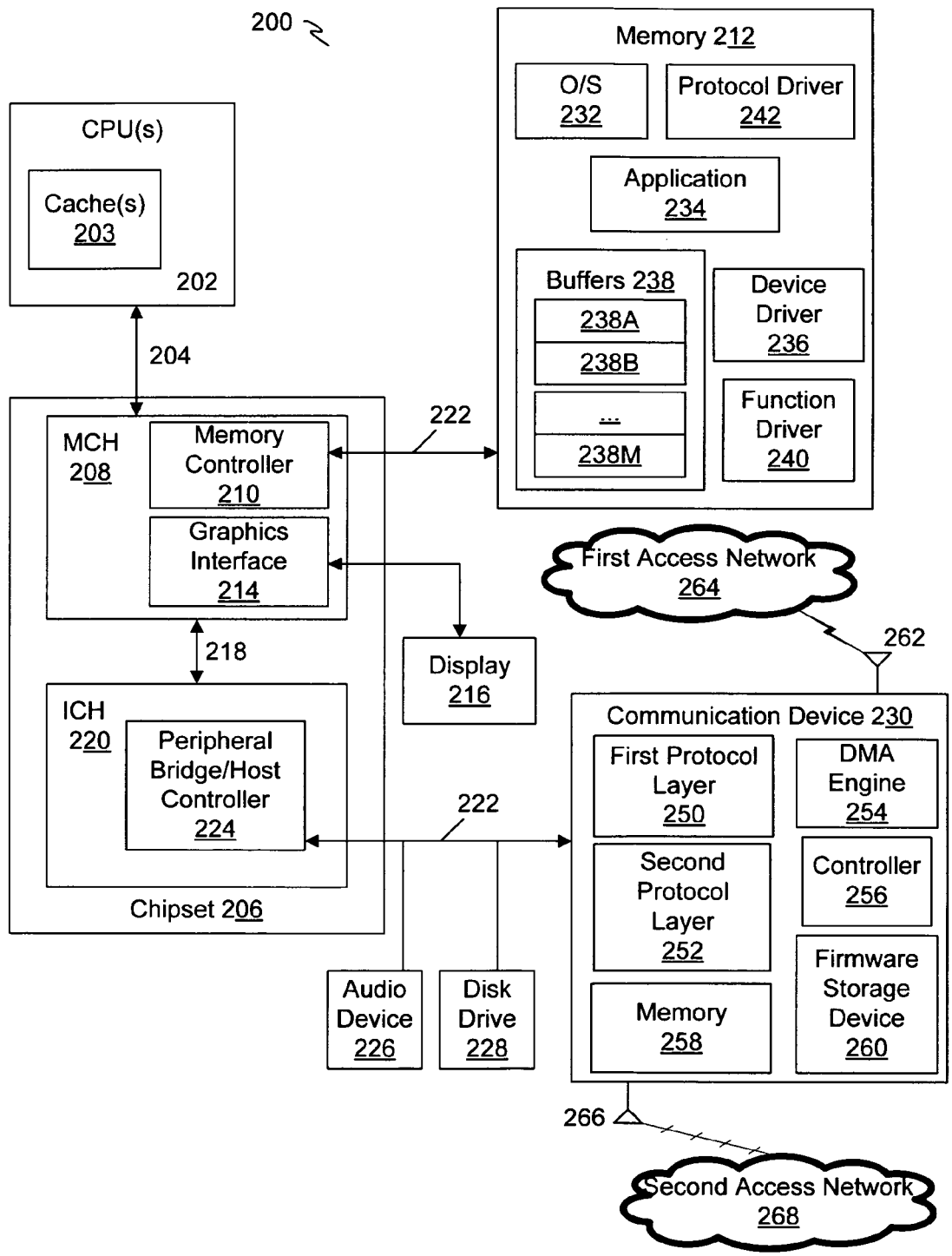
FIG. 2 illustrates a block diagram of a multi-com platform in accordance with various embodiments.

FIG. 2 illustrates a block diagram of a multiple communication (multi-corn) platform 200 with two radios for heterogeneous wireless communication in accordance with various embodiments of the invention. The multi-corn platform 200 may include one or more host processors or central processing unit(s) (CPUs) 202 (which may be collectively referred to herein as "processors 202" or more generally "processor 202") coupled to an interconnection network or bus 204. The processors 202 may be any type of processor such as a general purpose processor, a network processor (which may process data communicated over a computer network), etc. (including a reduced instruction set computer (RISC) processor or a complex instruction set computer (CISC)). Moreover, the processors 202 may have a single or multiple core design. The processors 202 with a multiple core design may integrate different types of processor cores on the same integrated circuit (IC) die. Also, the processors 202 with a multiple core design may be implemented as symmetrical or asymmetrical multiprocessors.

The processor 202 may include one or more caches 203, which may be private and/or shared in various embodiments. Generally, a cache 203 stores data corresponding to original data stored elsewhere or computed earlier. To reduce memory access latency, once data is stored in a cache 203, future use may be made by accessing a cached copy rather than refetching or recomputing the original data. The cache 203 may be any type of cache, such a level 1 (L1) cache, a level 2 (L2) cache, a level 3 (L-3), a mid-level cache, a last level cache (LLC), etc. to store electronic data (e.g., including instructions) that is utilized by one or more components of the multi-corn platform 200.

A chipset 206 may additionally be coupled to the interconnection network 204. The chipset 206 may include a memory control hub (MCH) 208. The MCH 208 may include a memory controller 210 that is coupled to a memory 212. The memory 212 may store data, e.g., including sequences of instructions that are executed by the processor 202, or any other device in communication with components of the multi-corn platform 200. In various embodiments, the memory 212 may include one or more volatile storage or memory devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 204, such as multiple processors and/or multiple system memories.

The MCH 208 may further include a graphics interface 214 coupled to a display 216, e.g., via a graphics accelerator. In various embodiments, the display device 216, which, for example may include a man-machine interface, a flat panel display or a cathode ray tube, may be coupled to the graphics interface 214 through, for example, a signal converter that translates a digital representation of an image stored in a storage device such as video memory or system memory into display signals that are interpreted and displayed by the display. The display signals produced by the display device 216 may pass through various control devices before being interpreted by and subsequently displayed on the display device 216.

As shown in FIG. 2, a hub interface 218 may couple the MCH 208 to an input/output control hub (ICH) 220. The ICH 220 may provide an interface to input/output (I/O) devices coupled to the multi-com platform 200. The ICH 220 may be coupled to a bus 222 through a peripheral bridge or host controller 224, such as a peripheral component interconnect (PCI) bridge, a universal serial bus (USB) controller, etc. The controller 224 may provide a data path between the processor 202 and peripheral devices. Other types of topologies may be utilized. Also, multiple buses may be coupled to the ICH 220, for example, through multiple bridges or controllers. For example, the bus 222 may comply with the Universal Serial Bus Specification, Revision 1.1, Sep. 23, 1998, and/or Universal Serial Bus Specification, Revision 2.0, Apr. 27, 2000 (including subsequent amendments to either revision). Alternatively, the bus 222 may comprise other types and configurations of bus systems. Moreover, other peripherals coupled to the ICH 220 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 222 may be coupled to an audio device 226, one or more rotating or solid state disk drive(s) 228, and a communication device 230, which in various embodiments may be a network interface card (NIC) or a tuner card. Other devices may be coupled to the bus 222. Also, various components such as the communication device 230 may be coupled to the MCH 208 in various embodiments. In addition, the processor 202 and the MCH 208 may be combined to form a single chip.

Additionally, the multi-corn platform 200 may include volatile and/or nonvolatile memory or storage. For example, nonvolatile memory may include one or more of the following: read-only memory (ROM), programmable ROM (PROM), erasable PROM (EPROM), electrically EPROM (EEPROM), a disk drive or solid state drive (e.g., 228), a floppy disk, a compact disk ROM (CD-ROM), a digital versatile disk (DVD), flash memory, a magneto-optical disk, or other types of nonvolatile machine-readable media capable of storing electronic data including instructions.

The memory 212 may include one or more of the following in various embodiments: an operating system (O/S) 232, application 234, device driver 236, buffers 238, function driver 240, and/or protocol driver 242. Programs and/or data stored in the memory 212 may be swapped into the solid state drive 228 as part of memory management operations. The processor(s) 302 executes various commands and processes one or more packets 246 with one or more computing devices coupled a first access network 264 through a first radio 262 and/or a second access network 268 through a second radio 266. In one embodiment, the first access network 264 is the WMAN 110 offering WiMAX services and the second access network 268 is the WLAN 120 or the WPAN 130. In another embodiment, the first access network 264 is the WLAN 120 or the WPAN 130 and the second access network 268 is the WLAN 120 offering WiMAX services.

In various embodiments, a packet may be a sequence of one or more symbols and/or values that may be encoded by one or more electrical signals transmitted from at least one sender to at least one receiver. For example, each packet may have a header that includes information that may be utilized in routing and/or processing of the packet may comprise the continuity counter, a sync byte, source address, a destination address, packet type, etc. Each packet may also have a payload that includes the raw data or content the packet is transferring between various stations.

In various embodiments, the application 234 may utilize the O/S 232 to communicate with various components of the multi-corn platform 200, e.g., through the device driver 236 and/or function driver 240. For example, the device driver 236 and function driver 240 may be used for different categories, e.g., device driver 236 may manage generic device class attributes, whereas the function driver 240 may manage device specific attributes (such as USB specific commands). In various embodiments, the device driver 236 may allocate one or more buffers to store packet data.

As illustrated in FIG. 2, the communication device 230 includes a first network protocol layer 250 and a second network protocol layer 252 for implementing the physical communication layer to send and receive network packets to and from the base station 105, the WPAN station 115, the access point 125, and/or other multi-corn platform(s) 200. The communication device 230 may further include a direct memory access (DMA) engine 252, which may write packet data to buffers 238 to transmit and/or receive data. Additionally, the communication device 230 may include a controller 254, which may include logic, such as a programmable processor for example, to perform communication device related operations. In various embodiments, the controller 254 may be a MAC (media access control) component. The communication device 230 may further include a memory 256, such as any type of volatile/nonvolatile memory (e.g., including one or more cache(s) and/or other memory types discussed with reference to memory 212).

In various embodiments, the communication device 230 may include a firmware storage device 260 to store firmware (or software) that may be utilized in management of various functions performed by components of the communication device 230. The storage device 260 may be any type of a storage device such as a non-volatile storage device. For example, the storage device 260 may include one or more of the following: ROM, PROM, EPROM, EEPROM, disk drive, floppy disk, CD-ROM, DVD, flash memory, a magneto-optical disk, or other types of nonvolatile machine-readable media capable of storing electronic data, including instructions.

In various embodiments, bus 222 may comprise a USB bus. Isochronous mode is one of the four data flow types for USB devices (the others being Control, Interrupt and Bulk). Isochronous mode is commonly used for streaming multimedia data types such as video or audio sources. In isochronous mode, a device can reserve bandwidth on the bus making isochronous mode desirable for multimedia applications.

Figure 3:
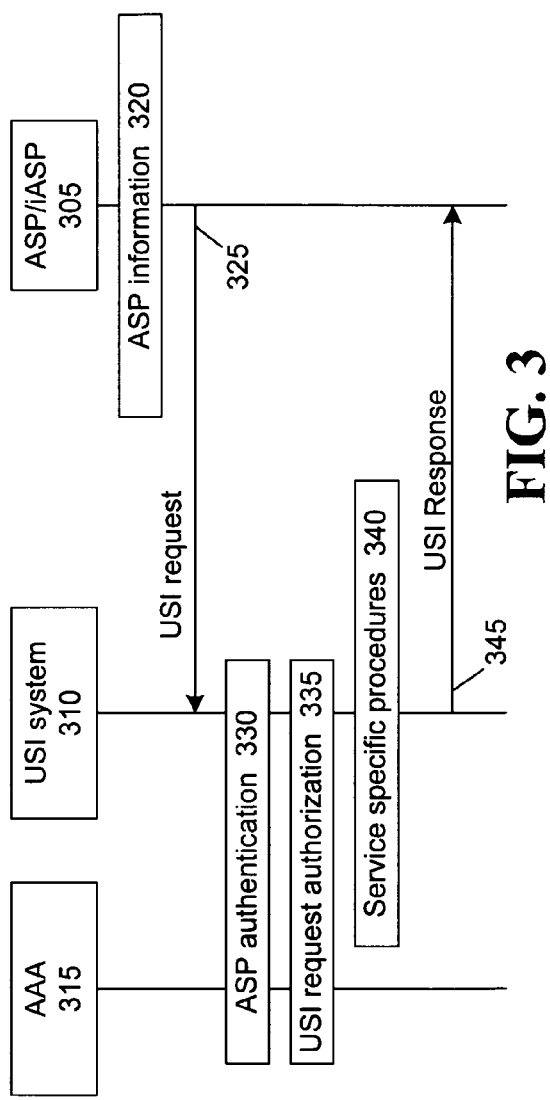
FIG. 3 illustrates a direct USI service flow initiated by an ASP.

FIG. 3 is an illustration that illustrates a direct USI service flow initiated by an ASP 305 with a USI system 310 and an authentication, authorization, and accounting (AAA) 315 system. The AAA 315 may be a server in a home network of the multi-com platform 200. The USI system 310 is a framework for specifying WiMAX network interfaces towards trusted third party ASPs, also referred to as iASPs, wherein a service level agreement (SLA) between a network service provider (NSP) may be required. The ASP 305 may refer to both an internet service provider business entity that offers services, applications, and aggregated contents on the public internet such as Yahoo!®, Google®, and E-Bay™ as well as the internet web site offering such services. The ASP 305 may have a further relationship with content providers and internet advertisers. In particular, the USI system 310 targets such ASPs 305 and related services in need of some sub-service from the NSP. In one embodiment, the NSP is a provider that operates and sells WiMAX services to an end user or user of the multi-com platform 200 of FIG. 2. The NSP exposes WiMAX network capabilities and multi-com platform 200 user information to the ASP 305 in a secure and controlled manner through a USI server of a USI system 310 and a USI interface. The USI server may be a NSP system that exposes WiMAX network capabilities and user information to the ASP 305. The multi-com platform 200 in one embodiment provides WiMAX and non-WiMAX communication capabilities and may both contain and execute a USI client application or a browser that can access a service offered by the ASP 305.

The USI system 310 may be a USI aware application or internet browser that allows exposure of WiMAX network capabilities and mobile user information between the NSP and ASP 305 in a secure and controlled manner. When the NSP is offering a USI service through a USI server, a client ASP or the nature of the USI service may demand the USI server to conduct a MS authentication procedure. The authentication procedure can be difficult to perform when the multi-corn platform 200 uses a non-WiMAX communication mode since the USI server of the NSP may not have a direct access to the multi-com platform 200.

The embodiment illustrated in FIG. 3 is a direct USI service flow initiated by the ASP 305 wherein the ASP 305 has information 320, such as the case where the ASP 305 has prior knowledge of an address of the USI system 310 and any requested USI identification information necessary to submit a USI request 325 from the ASP 305 to the USI system 310. For example, the ASP 305 may have USI identification information available from an earlier service flow. The USI system 310 performs an ASP authentication 330 with the AAA 315 system to authenticate the ASP 305. The USI request 325 is also authorized by the USI system 310 prior to providing service specific procedures 340. A USI response 345 is then delivered back to the ASP 305. If the direct USI service flow, as initiated by the ASP 305 in FIG. 3, is using an access network that does not provide WiMAX network capabilities, then the USI system 310 is not able to reach or authenticate the multi-com platform 200.

Figure 4:
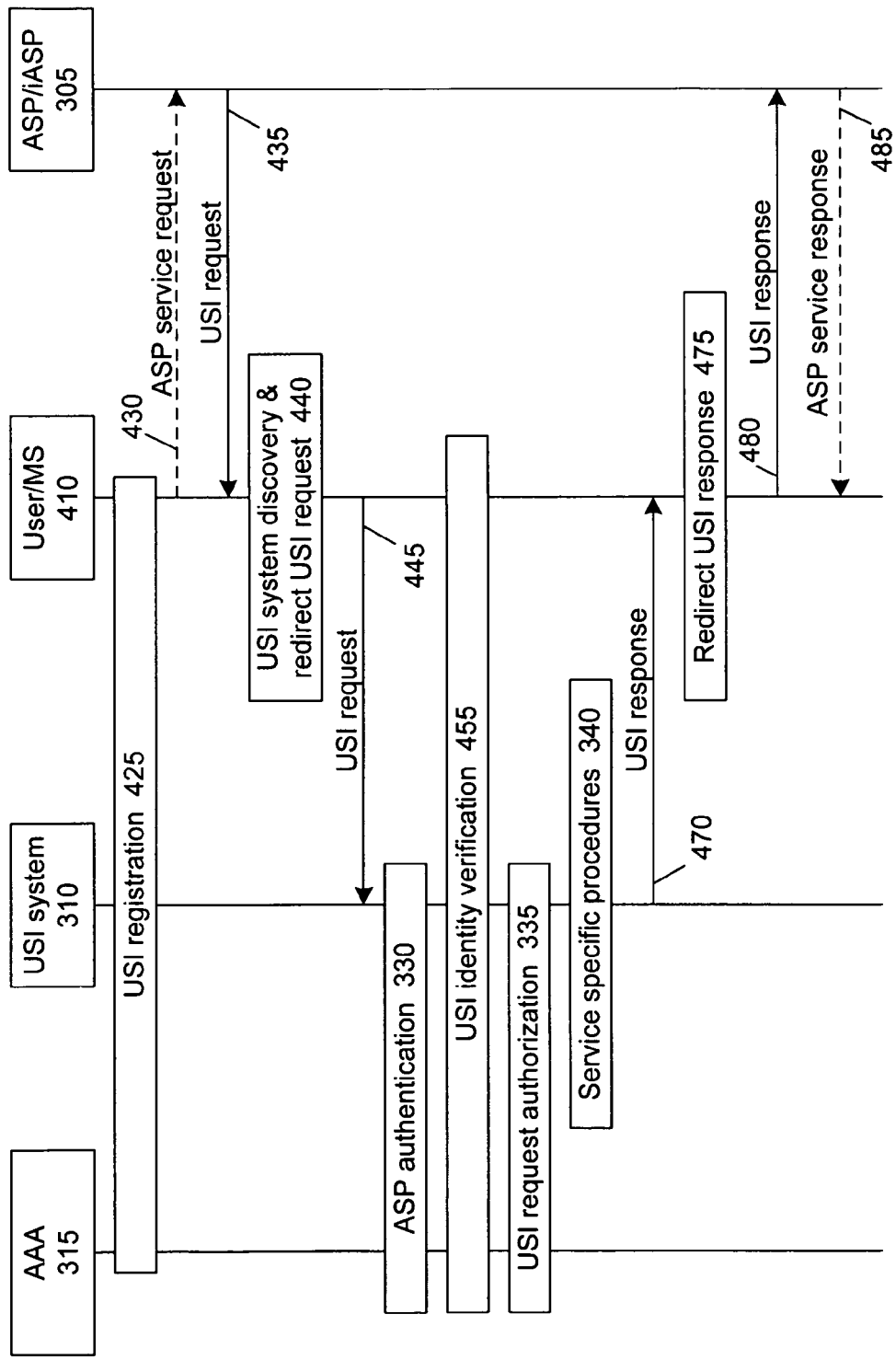
FIG. 4 illustrates a redirected USI service flow initiated by an ASP in accordance with some embodiments.

A redirected flow is described in FIG. 4 that allows the ASP 305 to use a user or mobile station (User/MS) 410, or a station (STA) in reference to the multi-radio subscriber station 135 of FIG. 1 or the multi-com platform 200 of FIG. 2, to detect the USI system 310 that serves the User/MS 410 when an access network used to access the ASP 305 is a non-WiMAX network. The redirected flow may also be used in an embodiment wherein the ASP 305 requests User/MS 410 authentication or USI system 310 identification allocation. In the redirected flow of FIG. 4, the User/MS 410 is registered with the USI system 310 and the AAA 315 using a USI registration 425. The User/MS 410 sends an ASP service request 430 to the ASP 305 using a non-WiMAX network, such as an 802.11 or 802.15 network. In one embodiment, the ASP service request 430 is sent over a Wi-Fi network using a Web browser, though the embodiment is not so limited. The ASP constructs a USI request 435 and sends the USI request 435 to the User/MS 410 with instructions to redirect the USI request 435 to the USI system 310.

The USI request 435 is redirected using hypertext transfer protocol (HTTP) or hypertext transfer protocol secure (HTTPS). HTTP is an application level protocol for distributed, collaborative, hypermedia information systems and is used for retrieving interlinked resources on the Web. HTTPS is a combination of the hypertext transfer protocol and a cryptographic protocol that provides a secure channel over an insecure network. For example, the HTTPS connection may be used for a payment transaction or for secure transactions of information over the Web. In an embodiment, the USI request 435 sent from the User/MS 410 to the USI system 310 to allow for direct communication, to provide identification of the User/MS 310 and for authentication by the USI system 310. The redirected flow of FIG. 4 may be used where authentication by the USI system 310 is requested or required.

A discovery procedure may be used in the redirected flow of FIG. 4 wherein the discovery procedure relies on a domain name system (DNS) query through a specific not fully-qualified domain/host name. Use of a specific not fully-qualified domain/host name allows local resolution by the NSPs own local DNS but does not provide for a globally unique name that is distinguishable from other entities on the Web. As an example, the specific not fully-qualified domain/host name used may be "usi.usi." As an alternative, the ASP 305 uses a pre-known and fully qualified domain name of the NSPs USI server instead of using the not fully-qualified domain/host name. This alternative may be performed by the ASP 305 by placing a constant representing the fully qualified domain name in HTTP or HTTPS headers.

The User/MS 410 optionally performs USI system 310 discovery procedures based at least in-part on what the ASP 305 requires. In one embodiment, a USI request 445 is transmitted by the User/MS 410 to the USI system 310, wherein the ASP 305 may be authenticated by ASP authentication 330 with assistance from the AAA 315 based at least in-part on information provided by the ASP 305.

In another embodiment, an identity of the User/MS 410 may be detected by the USI system 310 through USI identity verification 455 with assistance from the AAA 315, the USI system 310, and the User/MS 410. The USI system 310 checks for authorization to perform a USI request prior to service delivery using the USI request authorization 335. The ASP authentication 330, the USI identify verification 455, and the USI request authorization 335 may be performed separately, or alternatively, may be performed together to minimize message exchange. Service specific procedures 340 may be conducted by the USI system 310 and a USI response 470 is delivered back to the User/MS 410 with a redirect USI response 475 instructions to the ASP 305. The User/MS 410 redirects a USI response 480 to the ASP/iASP 305 and the ASP/iASP 305 delivers an ASP service response 485 to the User/MS 410.

Heterogeneous wireless communication, wherein a station (STA) configured to operate over a plurality of access networks, may be performed by sending a service request from a station (STA) such as the multi-corn platform 200 to an application service provider (ASP) 305 over a first access network such as a Wi-Fi network, though the embodiment is not so limited. The STA receives a universal services interface (USI) request 435 from the ASP 305 over the first access network, the USI request 435 comprising a fully qualified domain name (FQDN) of a USI system 310 for services provided by a network service provider (NSP) over a second access network, such as a WiMAX network. The STA can determine an intended USI system address based on the FQDN.

Figure 5:
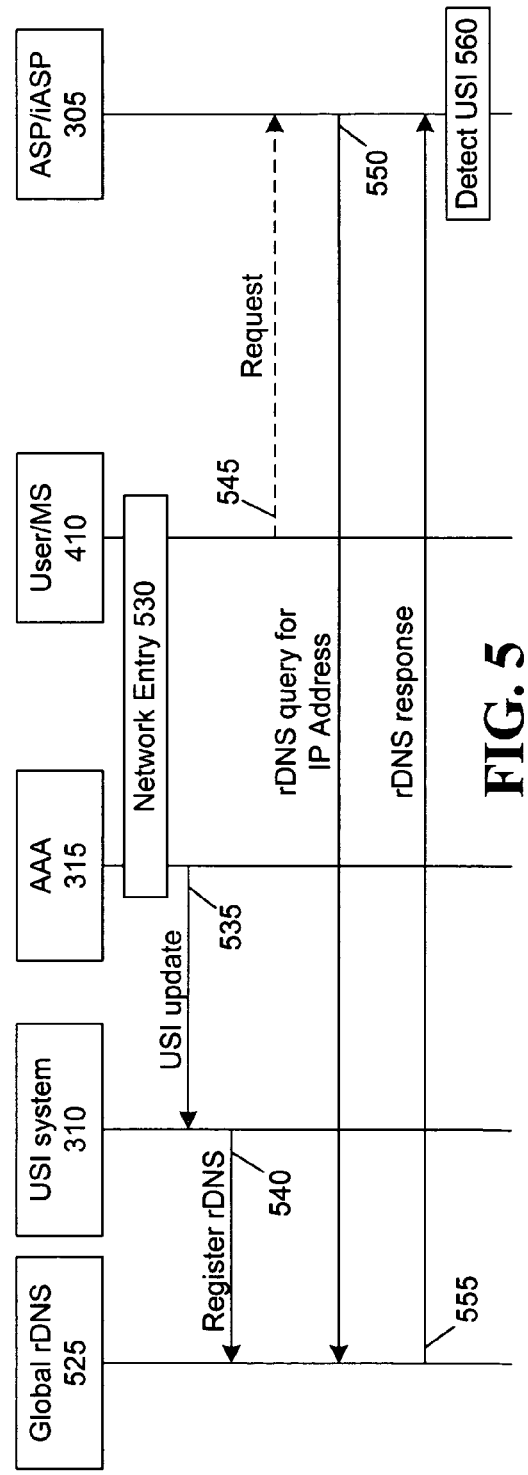
FIG. 5 illustrates serving USI system discovery in a connectivity service network (CSN) with a station in accordance with some embodiments.

FIG. 5 illustrates serving USI system discovery in a connectivity service network (CSN) with the User/MS 410. In an embodiment, the CSN is home to mobile WiMAX users and has functions of dynamic host configuration protocol (DHCP), AAA, billing and management of a WiMAX network, wherein users may roam between multiple CSNs but a home CSN provides authentication to CSNs visited by the User/MS 410. The illustration in FIG. 5 uses an Internet DNS as a medium to translate an internet protocol (IP) address into a domain name, as defined by the Internet Engineering Task Force (IETF) Request for Comments (RFC) 1035 "Domain Names—Implementation and Specification" November 1987 (RFC1035). In this embodiment, a reverse DNS query, as initiated by an ASP 305, is performed to an IP address of the User/MS 410, or STA such as the multi-com platform 200 or the multi-radio subscriber station 135. The reverse DNS query is performed to reveal information of the User/MS 410, such as a name of the User/MS 410, and/or information of a network address translation (NAT) server of a NSP.

In a first embodiment, an AAA 315 detects the network entry 530 of the User/MS 410 in the CSN and provides a USI update 535 to the USI system 310. The USI system 310 initiates a request to register reverse DNS (rDNS) 540 in a Global rDNS 525 system, such as through a pointer (PTR) query in an .IN-ADDR.ARPA domain as defined in RFC1035. In this embodiment, the User/MS 410 may initiate a lookup by sending a Request 545 to the ASP 305. The ASP 305 detects an IP address of the User/MS 410 and issues a rDNS query for IP Address 550 to the Global rDNS 525. In turn, the Global rDNS 525 sends a DNS response 555 to the ASP 305 to provide a NSP realm or domain name of the User/MS 410. The ASP 305 then detects USI 560 by translating or converting the domain name to a USI system address for the User/MS 410. An error result received by the ASP 305 may indicate that the User/MS 410 that sends the Request 545 to the ASP 305 is not a qualified USI user and does not have access to services such as those provided by a WiMAX network.

In another embodiment, the USI system 310 may send the Register rDNS 540 signal having a USI-specific record that is different than a domain name, thereby allowing separation of the domain realm of an IP address from an identity of the NSP or USI system 310. This may provide a way to specify a USI system 310 that is not serving the User/MS 410, such as when the User/MS 410 is roaming.

A USI system address of a USI system 310 serving a STA, such as a multi-corn platform 200 configured to communicate over a plurality of access networks, may be determined by a STA entering an access network comprising an authentication, authorization, and accounting (AAA) system and the USI system 310, wherein the AAA system 315 provides a USI update 535 to the USI system 310 and wherein the USI system 310 registers an internet protocol (IP) address of the STA in a global reverse domain name system (rDNS) 525. The STA sends a request to an application service provider (ASP) 305, wherein the ASP 305 detects the IP address of the STA, sends a domain name system (DNS) query 550 to the rDNS 525 to map the IP address of the STA to a domain of the DNS, receives a rDNS response 555 from the rDNS 525, wherein the rDNS response 555 comprises a network service provider (NSP) domain name, and converts the NSP domain name to the USI system address for the STA.

Figure 6:
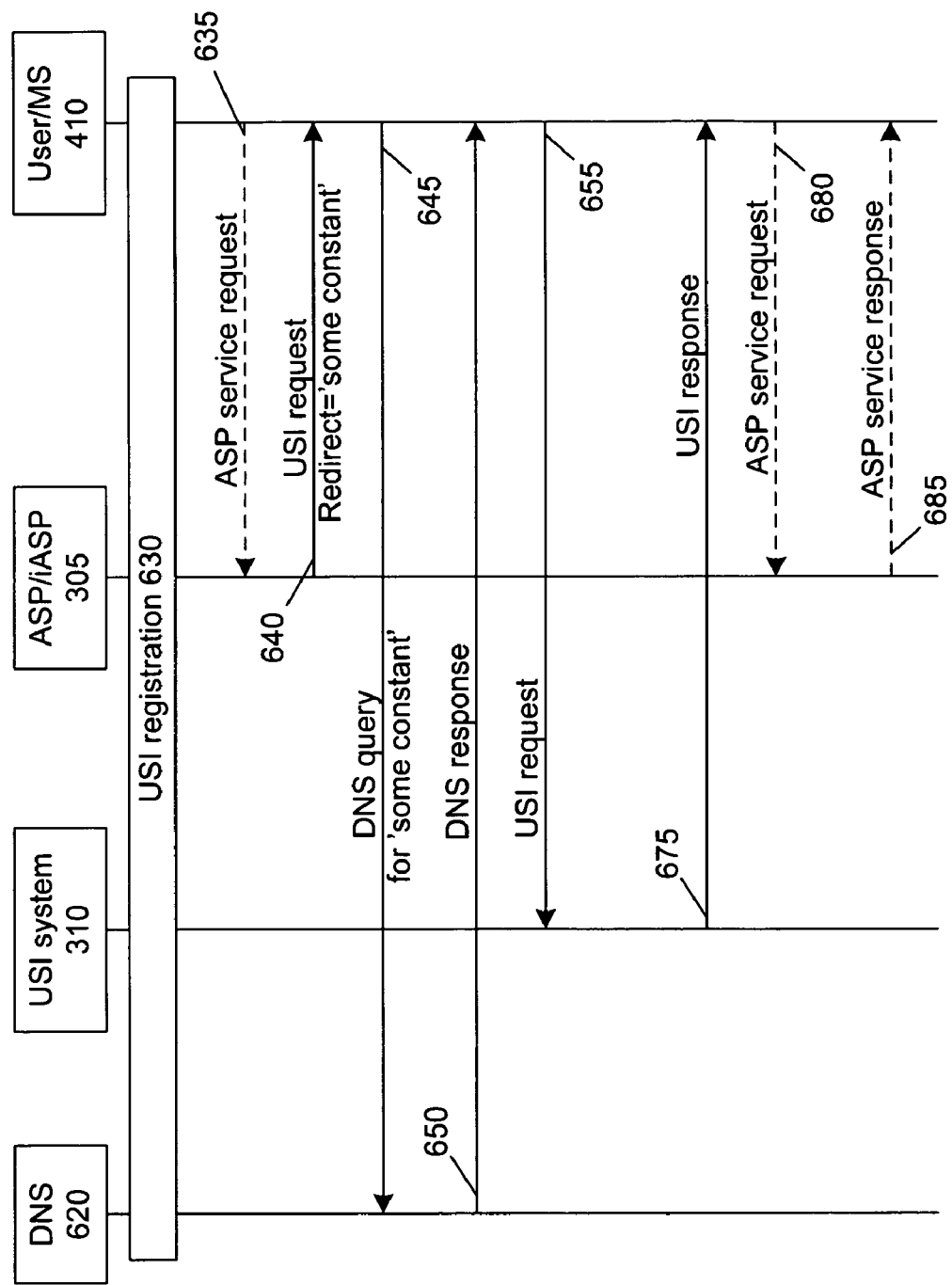
FIG. 6 illustrates a MS initiated flow for discovery of a USI system in accordance with some embodiments.

In a further embodiment of USI support discovery in a CSN with reference to FIG. 6, the User/MS 410 sends an ASP service request 635 to the ASP 305 wherein a fully qualified domain name (FQDN) of the USI system 310 is known to a global DNS network. A USI registration 630 provides for the DNS of the home CSN and visited CSN to be configured to correctly resolve a DNS name for the User/MS 410. A DNS address of the User/MS 410 is registered with a DNS server such as the Global rDNS 525 of FIG. 5 during network entry. The ASP 305 sends a USI request 640 to the User/MS 410 wherein the ASP 305 submits the USI request 435 having a generic DNS name without having prior knowledge of a currently serving USI system 310 for the User/MS 410. The currently serving USI system 310 in this embodiment may be either a home system or a visited system while roaming. The ASP 305 substitutes an address of the USI system 310 with a known DNS name, wherein the DNS name may be reserved. A USI request 655 is then submitted to the USI system 310 and a USI response 675 is sent to the User/MS 410 from the USI system 310. An ASP service request 680 may be sent from the User/MS 410 to the ASP 305 and an ASP service response 685 may be sent from the ASP 305 to the User/MS 410.

Figure 7:
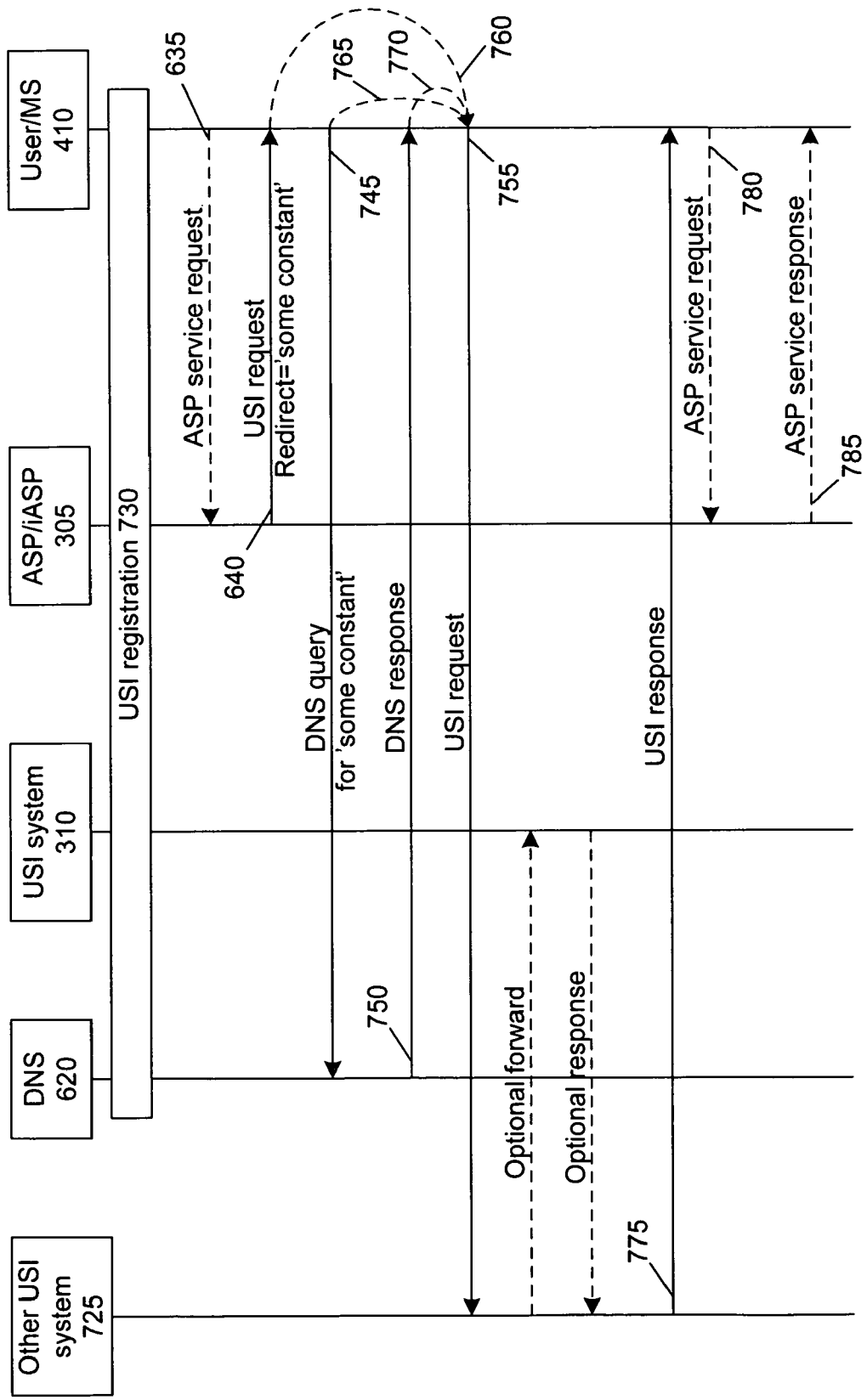
FIG. 7 illustrates a MS initiated flow for a redirected discovery of a USI system in accordance with some embodiments.

FIG. 7 illustrates a MS initiated flow for a redirected discovery of a USI system. As an example, the multi-com platform 200 of FIG. 2 operating on a 802.11 or 802.15 network that prompts for service from an ASP/iASP 305 does not have direct access to an access network such as a WiMAX network. In this embodiment, the User/MS 410 initiates an ASP service request 635 to the ASP 305. For example, the multi-com platform 200 may ask an ASP 305 to show location of the User/MS 410 on a map. The ASP 305 sends a USI request 640 to the User/MS 410 with a redirect message to direct the request to a USI system 310 with a specified name, or some constant name meant to indicate a currently serving USI system 310. The User/MS 410 may otherwise resolve the USI system name by sending a DNS query 745 to the DNS 620 serving the USI system 310. The DNS 620 responds by sending a DNS response 750 back to the User/MS 410 with an address of a currently serving USI system.

As illustrated in FIG. 7, the User/MS 410 may capture the USI request 640 and modify the USI System address to direct the message using a first path 760 to an Other USI system 725 over a USI request 755. The User/MS 410 may capture the USI request 640 redirect by identifying a 'Location:' header in a hypertext transfer protocol (HTTP) 302 redirect string or an HTTP POST as defined by HTTP/1.1 according to the IETF RFC 2616 (June 1999). Alternatively, the USI request 640 to redirect may also be captured by identifying an <address> element in a Simple Object Access Protocol (SOAP) message as defined by SOAP Version 1.2, W3C Recommendation 27 Apr. 2007.

Alternatively, the USI request 640 to redirect may also be captured at the DNS query 745. Name server access may be provided using transmission control protocol (TCP) RFC-793 on server port 53 (decimal) or through datagram access using user datagram protocol (UDP) RFC-768 on UDP port 53 (decimal). Capture of the DNS query 745 may occur by scanning for outgoing UDP or TCP traffic on port 53 using a hook provided by an operating system (OS) or in a network card or firmware. An outgoing packet of the DNS query 745 may be cancelled and the USI request 445 redirect may be directed over a second path 765 to the USI request 755 to the other USI system 725.

As another example, the USI request 640 to redirect may also be captured at the DNS response 750. Similarly, name server access may be provided using TCP RFC-793 on server port 53 (decimal) or through datagram access using UDP RFC-768 on UDP port 53 (decimal). Capture of the DNS query 745 may occur by scanning for incoming UDP or TCP traffic on port 53 using a hook provided by an operating system (OS) or in a network card or firmware. Incoming data of the DNS response 750 may be modified and the USI request 640 redirect may be directed over a third path 770 over the USI request 755 to the other USI system 725. The USI request 755 to the Other USI system 725 may optionally be forwarded to the USI system 310 serving the User/MS 410 and a response may optionally be sent back to the Other USI system 725 to conduct service specific procedures for a USI response 775 sent back to the User/MS 410. ASP service request 780 is sent from the User/MS 410 to the ASP 305 and an ASP service response 785 is sent back to the User/MS 410.

A method for receiving a USI request and redirecting the request to another USI system 725 by a station (STA) such as the multi-corn platform 200 or the multi-radio subscriber station 135 may involve registering the STA or User/MS 410 with an application service provider ASP 305, the USI system 310, and the domain name server DNS 620. The ASP service request 635 is sent from the STA to the ASP 305. The USI request 640 is sent from the ASP 305 to the STA, wherein the USI request 640 comprises a first USI system name of the USI system 310. The USI request 640 is modified by the STA to be directed to the other USI system 725. Then the USI request 725 is redirected from the USI system 310 to the other USI system 725.

The descriptions provided above in reference to FIGS. 1-8 may be combined in additional embodiments to allow a STA to communicate over a first access network, such as a Wi-Fi network or a LAN, to access services provided by a second access network even when the STA is not accessing the second access network, such as a WiMAX network. As an example, the STA may access a service offered through a USI, such as an electronic payment service, regardless of whether the STA is requesting the service through the first access network or the second access network.

Embodiments may be described herein with reference to data such as instructions, functions, procedures, data structures, application programs, configuration settings, etc. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. Thus, the term "program" may be used to refer to any collection of instructions which, when executed by the multi-corn platform 200, provides for universal services interface networking. The programs in the multi-corn platform 200 may be considered components of a software environment.

The operation discussed herein may be generally facilitated via execution of appropriate firmware or software embodied as code instructions on the host processor and microcontroller of the multi-corn platform 200, the base station 105, the WPAN station 115, the access point 125 and/or the multi-radio subscriber station 135, as applicable. Thus, embodiments of the invention may include sets of instructions executed on some form of processing core or otherwise implemented or realized upon or within a machine-readable medium. A machine-readable medium includes any mechanism for storing or transmitting information in a form readable by a machine (e.g., a computer). For example, a machine-readable medium can include an article of manufacture such as a read only memory (ROM); a random access memory (RAM); a magnetic disk storage media; an optical storage media; and a flash memory device, etc. In addition, a machine-readable medium may include propagated signals such as electrical, optical, acoustical or other form of propagated signals (e.g., carrier waves, infrared signals, digital signals, etc.).

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. A method of heterogeneous wireless communication, comprising:
    sending a service request from a station (STA) to an application service provider (ASP) over a first access network, wherein the STA is configured for heterogeneous wireless communication by using a first radio to communicate over the first access network and a second radio to communicate over a second access network;
    receiving, in response to the service request, a universal services interface (USI) request from the ASP over the first access network, the USI request comprising a fully qualified domain name (FQDN) of a USI system for services provided by a network service provider (NSP) over the second access network; and
    determining a USI system address based on the FQDN.

2. The method of claim 1, further including registering the STA with the USI system and a home authentication, authorization, and accounting (AAA) system.

3. The method of claim 1, further including directing the USI request to the USI system based on the USI system address.

4. The method of claim 3, further including verifying an identification of the USI system using a home authentication, authorization, and accounting (AAA) system.

5. The method of claim 4, further including receiving a USI response from the USI system and sending the USI response to the ASP.

6. The method of claim 5, further including receiving the service request from the ASP over the first access network.

7. The method of claim 1, wherein the USI request further comprises a constant placed between hypertext transfer protocol (HTTP) or hypertext transfer protocol secure (HTTPS) headers.

8. A method for redirecting a Universal Services Interface (USI) request by a station (STA), comprising:
    registering the STA with an application service provider (ASP), a USI system, and a domain name server (DNS), wherein the STA is configured for wireless communication over a radio;
    sending, after said registering, a service request from the STA to the ASP;
    receiving, in response to said sending, a USI request from the ASP, the USI request comprising a first USI system name of a first USI system;
    modifying the USI request to direct the USI request to a second USI system; and
    redirecting the USI request to the second USI system.

9. The method of claim 8, further including sending a DNS query to the DNS.

10. The method of claim 8, further including receiving a DNS response from the DNS.

11. The method of claim 8, further including receiving a USI response from the second USI system, sending the service request to the ASP, and receiving an ASP service response from the ASP.

12. A method for determining a Universal Services Interface (USI) system address of a USI system for a station (STA), comprising:
    entering an access network comprising an authentication, authorization, and accounting (AAA) system and the USI system, wherein the AAA system provides a USI update to the USI system and wherein the USI system registers an internet protocol address of the STA in a global reverse domain name system (rDNS); and
    sending, after said entering of the access network, a request from the STA to an application service provider (ASP), wherein the ASP:
        detects an internet protocol (IP) address of the STA,
        sends a domain name system (DNS) query to the rDNS to map the IP address of the STA to a domain of the DNS,
        receives a rDNS response from the rDNS, wherein the rDNS response comprises a network service provider (NSP) domain name, and
        converts the NSP domain name to the USI system address for the STA.

13. The method of claim 12, wherein the rDNS response comprises a DNS record specific to the USI system.

14. A station (STA) configured for heterogeneous wireless communication by using a first radio and a second radio to communicate over a first access network and a second access network, respectively, wherein the STA comprises:
    one or more processors; and
    one or more computer readable media having instructions that, when executed by at least one of the one or more processors, result in the STA:
    sending a service request from the STA to an application service provider (ASP) over the first access network;
    receiving, in response to the service request, a universal services interface (USI) request from the ASP over the first access network, wherein the USI request comprises a fully qualified domain name (FQDN) of a USI system for services provided by a network service provider (NSP) over the second access network; and
    determining a USI system address based on the FQDN.

15. The STA of claim 14, wherein the first access network is a Wireless Fidelity (Wi-Fi) network or a Wireless Local Area Network (WLAN) and the second access network is a Worldwide Interoperability for Microwave Access (WiMAX) network.

16. A station (STA) comprising a wireless communication device for heterogeneous wireless communication configured:
    to register with an application service provider (ASP), a USI system, and a domain name server (DNS);
    to send a service request to the ASP;
    to receive a USI request from the ASP, wherein the USI request comprises a first USI system name of a first USI system;
    to modify the USI request to direct to a second USI system; and
    to redirect the USI request to the second USI system.

17. The station (STA) of claim 16, wherein the wireless communication device is further configured to send a DNS query to the DNS, to receive a DNS response from the DNS, to receive a USI response from the second USI system and sending the service request to the ASP, and to receive an ASP service response from the ASP.

18. A station (STA) comprising:
    a wireless communication device for heterogeneous wireless communication, wherein the STA is configured to:
        determine a Universal Services Interface (USI) system address of a USI system, wherein the STA enters an access network comprising an authentication, authorization, and accounting (AAA) system and the USI system, wherein the AAA system provides a USI update to the USI system and wherein the USI system registers an internet protocol address of the STA in a global reverse domain name system (rDNS), and send a lookup request from the STA to an application service provider (ASP), wherein the ASP: detects an internet protocol (IP) address of the STA, sends a domain name system (DNS) query to the rDNS to map the IP address of the STA to a domain of the DNS, receives a rDNS response from the rDNS, wherein the rDNS response comprises a network service provider (NSP) domain name, and converts the NSP domain name to the USI system address for the STA.

19. The STA of claim 18, wherein the STA is further configured to receive a rDNS response from the rDNS, wherein the DNS response comprises a DNS record specific to the USI system.

20. A method of wireless communication, comprising:

determining a Universal Services Interface (USI) system address of a first USI system based on a fully qualified domain name (FQDN) or a network service provider (NSP) domain name using a station (STA) configured for wireless communication over a radio; and redirecting, after determining of the USI system address, a USI request received by the STA by receiving the USI request from an application service provider (ASP), modifying the USI request to direct the USI request from the first USI system to a second USI system, and redirecting the USI request to the second USI system.

* * * * *